Figure 1:
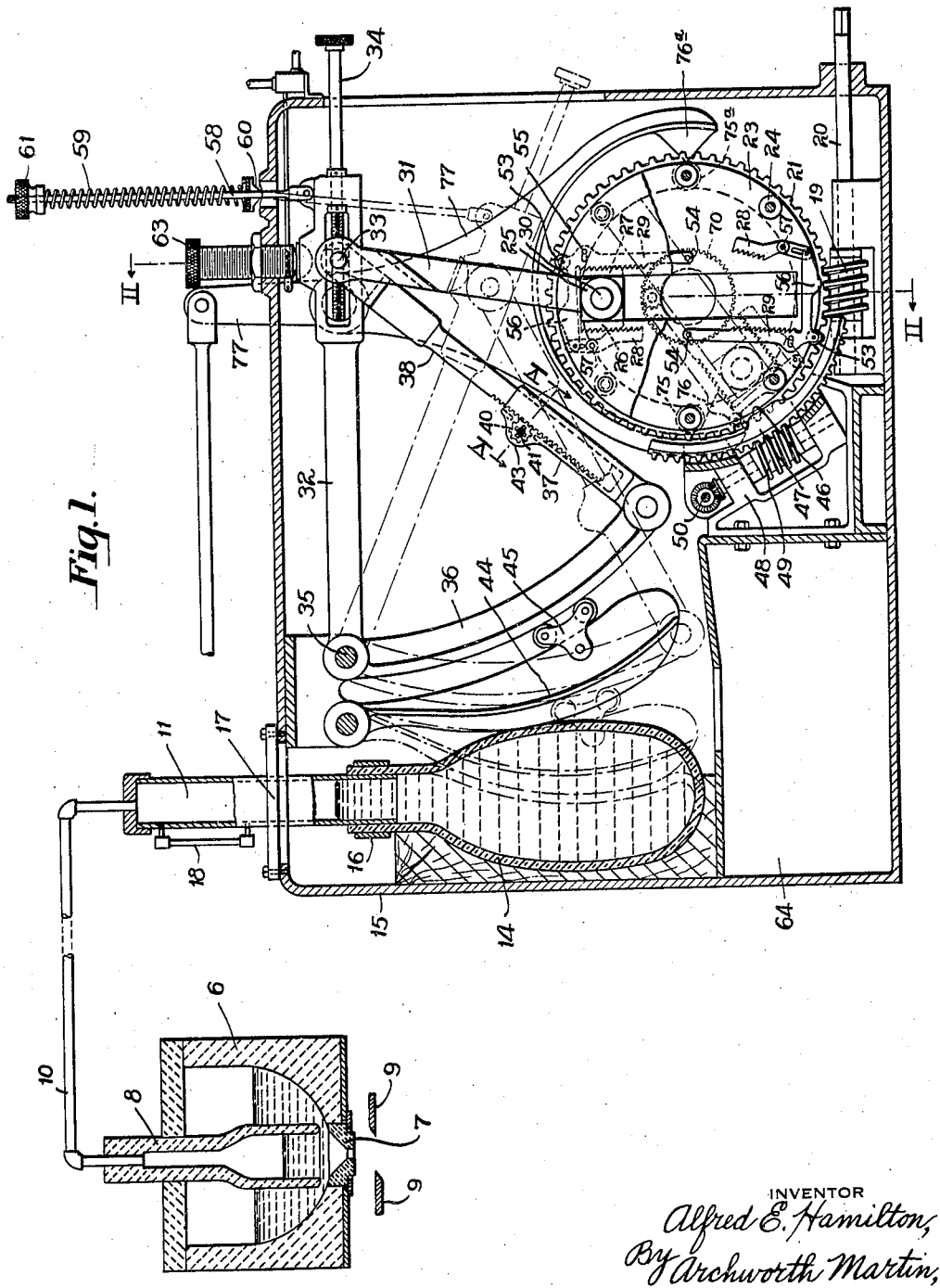

April 23, 1935.  A. E. HAMILTON  1,998,616
METHOD OF AND APPARATUS FOR FEEDING GLASS
Filed Oct. 31, 1932  2 Sheets-Sheet 1

INVENTOR
Alfred E. Hamilton,
By Archworth Martin,
Attorney.

April 23, 1935. A. E. HAMILTON 1,998,616
METHOD OF AND APPARATUS FOR FEEDING GLASS
Filed Oct. 31, 1932 2 Sheets-Sheet 2
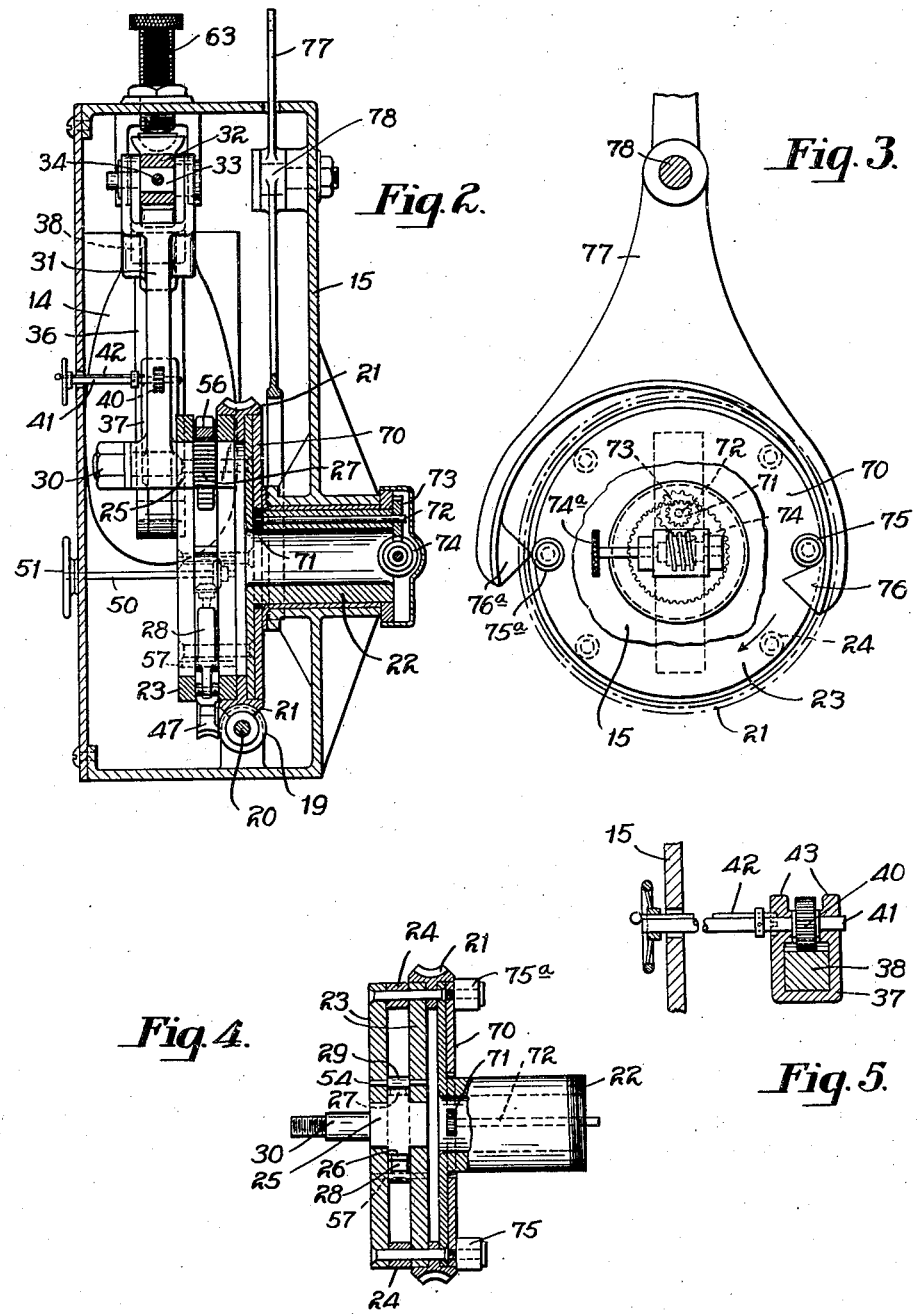

Patented Apr. 23, 1935

1,998,616

UNITED STATES PATENT OFFICE 1,998,616

METHOD OF AND APPARATUS FOR FEEDING GLASS

Alfred E. Hamilton, Pittsburgh, Pa.

Application October 31, 1932, Serial No. 640,387

18 Claims. (Cl. 49—55)

My invention relates to a method of and apparatus for feeding molten glass, and is especially applicable to that type of apparatus whereby gobs or charges of molten glass are fed from a furnace boot or forehearth to molding apparatus.

In the feeding of glass charges to molds, and particularly in the feeding of charges for the machine production of small articles, many difficulties have been experienced in accurately controlling the sizes and shapes of the charges. Among the methods employed for feeding charges of glass have been that of fluid pressure control, involving pressures and vacuum within a bell disposed above the flow ring commonly found at the bottom of a furnace boot.

One of the difficulties with some of the pressure and vacuum types of feeders heretofore employed is that of accurately controlling and varying the degrees of pressure and suction within the bell, and effecting fluid pressure changes within the bell in properly timed relation to severing mechanism.

One object of my invention is to provide apparatus of generally simplified and improved form whereby the use of numerous control valves or other pressure control devices is rendered unnecessary to extremely accurate control of pressure and vacuum conditions within the bell.

Another object of my invention is to provide apparatus which may be readily adjusted to secure varying sizes and shapes of gobs or mold charges.

Still another object of my invention is to provide a simplified mechanism for effecting pulsations of air or other fluid within the bell.

Apparatus whereby my invention may be practised is shown in the accompanying drawings wherein Figure 1 is a sectional view through a portion of a glass furnace and the mechanism for effecting and controlling flow of glass from the furnace, the section through the furnace being on a far more greatly reduced scale than is the section through the operating mechanism; Fig. 2 is a view taken on the line II—II of Fig. 1; Fig. 3 is a side elevational view of a portion of the apparatus of Fig. 2; Fig. 4 is a horizontal sectional view of a portion of the apparatus of Fig. 2, and Fig. 5 is a view, on an enlarged scale, taken on the line V—V of Fig. 1.

At 6, I indicate a furnace boot or forehearth which may be of any well-known type. The usual flow ring 7 and orifice is provided in the bottom of the boot, and a bell 8 is positioned above the flow ring with its lower edge in spaced relation to the bottom of the boot. Shears 9 of any suitable type are positioned beneath the flow ring and may be operated as hereinafter described, to periodically sever charges of glass which will fall into molds. A fluid pressure line 10 has communication with the upper end of the bell, and with a chamber 11, pressure and suction conditions being periodically created within the bell 8 as hereinafter more fully described.

A bag or collapsible bulb 14 is disposed within a casing 15 and is tightly clamped by a clamping ring 16 to the lower end of the chamber 11, the chamber 11 being supported in a cover plate 17. Mercury or other liquid is contained within the bulb 14 and is periodically forced up into the conduit 11 by the apparatus to be hereinafter described.

A gauge glass 18 is provided so that the operator may observe the pulsating actions of the liquid within the chamber 11. It will be understood that when the bulb 14 is compressed, the mercury will be forced up into the chamber 11 thus compressing the air that is contained within the pipe 10 and the bell 8 and thereby exerting an extrusive pressure on that portion of the glass which is immediately above the orifice 7. When the bulb 14 is released, the mercury will flow downwardly to relieve the pressure within the bell 8 and to perhaps actually create a partial vacuum within the bell, depending upon the extent of movement given to the mercury. The pressure conditions within the bell will, of course, be varied in accordance with various factors, such as the fluidity of the glass, the size and shape of gobs or charges to be produced, etc.

The bulb 14 may suitably be of rubber, rubberized fabric, or any other flexible material which has sufficient strength and wearing quality to support the weight of the mercury and to withstand flexing. The volume of mercury employed will be dependent upon the size and length of the passageways leading to the bell, the size of the bulb, the sizes of glass charges to be produced, etc. For ordinary use, I have found that 100 lbs. of mercury will produce satisfactory results.

A worm 19 is disposed within the casing 15 and its shaft 20 is driven from any suitable source of power. The worm meshes with a worm wheel 21 which is provided with a stub shaft 22 (Fig. 2) that is journalled in a bearing at the side of the casing. A pair of crank discs 23 are secured to the gear wheel 21, spacing blocks 24 being interposed between the plates 23.

The plates 23 are slotted to receive the ends of a cross head 25 that is slidably supported therein. The edges 26 and 27 of the cross head are toothed for engagement with pawls 28 and 29 respectively, that are pivotally supported between the plates 23, a pair of pawls 28 and 29 being provided at each end of the slots. The cross head 25 carries a crank pin 30 to which a crank arm 31 is connected at its lower end, the upper end of the crank arm being connected to a lever 32 through a pin 33. The pin 33 is adjustably supported within the lever 32 and has threaded connection with an adjusting rod 34 that is rotatably supported in the outer end of the lever 32, so that the pin at 33 may be adjusted longitudinally of the lever 32, thereby to permit adjusting the "throw" of the lever 32.

The lever 32 is pivotally supported at 35 by a bracket which is secured to the walls of the casing, and a presser member 36 is also pivotally connected to the pin 35, at its upper end, and at its lower end is pivotally connected to a link section 37. A link section 38 has telescopic connection with the section 37. The upper end of the section 38 is pivotally connected to the pin 33. As shown more clearly in Fig. 5, the link sections 37—38 are adjustably connected by means of a pinion 40 that meshes with rack teeth that are formed on the upper edge of the section 38. The pinion 40 is splined on a shaft 41 that is journalled in wing-like extensions 43 of the section 37, and extends through the wall of the casing 15, and is provided with a hand wheel on its outer end.

The wall of the casing is slotted to permit the shaft 41 to move with the link 37—38 during reciprocating movements of the link. The shaft 41 carries a locking rod 42 whose inner end is movable into engagement with a series of holes formed in the wing-like extension of the link 37 so as to releasably maintain the shaft 41 and the pinion 40 in various set positions.

A shoe 44 is pivotally supported at its upper end and is interposed between the presser 36 and the bag 14, the shoe preferably being of convex form at its forward side to more effectively compress the bag, and cause mercury to flow up into the chamber 11, as heretofore explained. The curvature or convexity of the shoe 44, both longitudinally and transversely thereof is approximately the same as the curvatures of the bag 14, so that there is a minimum of friction between them. A yoke 45 is pivotally connected to the shoe and carries rollers against which the presser 36 bears, to reduce friction between the presser and the shoe.

Ordinarily, the shaft 20 will be constantly driven, to rotate the worm gear 21 and the crank discs 23. Such movement will result in the cross head 25 being carried from the position shown in full lines in Fig. 1, toward the dotted line position. During this travel, the cross head is locked to the crank plates by the pawls 28 and 29. The cooperating teeth at 26 and 28 are inclined in such direction that during the first part of said travel, the cross head is held against radially outward movement with respect to the plates 23, while the teeth at 27 and 29 are pointed in the opposite direction so that they prevent radially inward movement of the cross head when it has reached approximately the dotted line position.

However, a tripping device for the pawls 28 and 29 is provided in the form of a stop 46 that is carried by a segmental gear ring 47 which is slidably mounted on a bracket 48. A worm 49 is journalled in the bracket, and meshes with the segment 47. The upper end of the worm 49 has bevel gear connection with a shaft 50 whose outer end extends through the casing, and which is operated by a hand wheel 51. By turning the hand wheel 51, the segment 47 is adjusted circumferentially of the plates 23. During rotative movement of the plates 23, the stop 46 will be engaged by a roller 53 which is carried in an extension, of the pawl 29. Each pawl 29 is pivotally mounted at one end 54 to the plates 23 and has a slot in its upper end through which a pin 55 extends, the pin being carried by the plates 23.

The pawl 29 has a lateral weighted extension 56 which has pin-and-slot connection with the outer end of the pawl 28, the pawl 28 being pivoted at 57 to the plates 23. It will be seen that when the roller 53 engages the stop 46, the pawls 28 and 29 will be swung in clockwise directions to disengage the teeth 26 and 27, thereby releasing the cross head 25 for radial movement within the plates 23.

A pull rod 58 extends through the upper wall of the casing and is surrounded by a spring 59 whose lower end seats upon a block 60 which is tiltably supported on the upper wall of the casing. A thumb nut 61 has threaded engagement with the upper end of the rod 58. The thumb nut 61 can, of course, be adjusted to vary the spring tension.

The rod 58 is pivotally connected to the lever 32 and the spring 59 yieldably maintains the lever 32 and the crank arm 31 in their uppermost positions. Consequently when the pawls 28 and 29 are tripped, as heretofore explained, and with the cross head 25 at or near the position shown in dotted lines in Fig. 1, the spring will cause the cross head to slide from its dotted line position to the diametrically opposite side of the plates 23, and at the same time, returning the lever 32 and the links 37—38 to their full line positions.

When the pawls are tripped, and are at points toward the lower edge of the plates 23, the weighted extension 56 will maintain the pawls 28—29 in their open position, as shown at the lower side of Fig. 1, and such open position is maintained until the pawls reach approximately the uppermost point in their path of travel, whereupon the weight will force the pawls closed, and cause them to engage the teeth 26 and 27, respectively, of the cross head.

The rotative movement of the plates 23 and consequent pull exerted on the crank arm 31 swings the lever 32 and the link 38 downwardly to push the presser 36 against the shoe 44, thereby compressing the bag 14 and forcing the mercury into the chamber 11 to cause or permit extrusive movement of glass through the orifice 7. This compressing movement is continued until the pawls 28 and 29 are tripped, and the crosshead 25 returns toward its upper position under the influence of the spring 59, whereupon the mercury will flow back from the chamber 11, thereby creating suction within the bell.

Under some conditions it may not be desired to create a substantial degree of suction within the bell, in which case the bag 14 will not be permitted to fully expand under the weight of the mercury. The extent to which the shoe 44 is permitted to move away from the bag is controlled by the rack and pinion adjustment at 40, as well as by a stop screw 63 that is threaded into the upper wall of the casing, and limits upward movement of the lever 32. The rack and pinion adjustment at 40 can be varied to control the extent to which the bag is compressed. Thus, if the link 37—38 is fully extended, the bag will be fully compressed upon each operation of the presser 36. A well 64 is provided beneath the bag 14 to catch and save the mercury in case the bag leaks or becomes broken.

From the foregoing, it will be understood that when the bag is compressed, a feeding impulse will be imparted to the glass, and this feeding impulse will be made more pronounced in the case of rather viscous glass, and in cases where large gobs are being formed. For more fluid glass, and smaller charges, but little force will be required to secure desired flow through the orifice 7. When a desired quantity of glass has issued through the orifice, suction will be created by release of the bag and gravity return of the mercury. The change from pressure to suction may be effected so quickly as to effect necking of the gob-shearing point, or the change from pressure to suction may be made more slowly in order to form an attenuated gob for certain classes of work.

The duration of the application of extrusive force can be controlled by adjusting the stop 46 as heretofore indicated, so that the cross head 25 will be tripped early or later, as desired. Furthermore, the rate of return or outward movement of the cross head, and hence the rate of withdrawal of the compressor 36 can be regulated by adjusting the thumb nut 61, so that the rate of expansion of the spring 59 can be varied.

In order that the shears 9 may be operated in synchronism and properly timed relation with respect to the feeding impulses, I provide a ring plate 70 whose edge is seated against the inner peripheral wall of the worm gear 21 (Figs. 3 and 4). The inner periphery of the ring 70 is toothed for engagement with a pinion 71 that is carried on the inner end of a shaft 72. The outer end of the shaft 72 carries a worm gear 73 that meshes with a worm 74. The worm 74 is operated by a thumb nut 74a to thereby effect rotative adjustments of the ring plate 70. The ring plate carries rollers 75 and 75a which function as stops that cooperate with the teeth 76 and 76a of a yoke 77. The ring plate 70 and the worm drive 73—74 are loosely supported on the shaft 22 and rotate as a unit with the worm gear 21, so that the rollers 75 are periodically brought into engagement with the teeth 76 to effect oscillation of the yoke 77.

The yoke 77 is pivotally mounted on the casing at 78, and its upper end has connection with a pull rod which, through suitable connections, will operate the shears 9 in timed relation to rotative movement of the worm gear 21.

It is desirable, of course, that the shears 9 open quite quickly after they have been closed to sever a glass charge, to avoid piling of glass on top of the shear blades. Assuming that the ring plate 70 is turning in the direction indicated by the arrow in Fig. 3, and that the roller 75a has made engagement with the tooth 76a, to swing the yoke 77 in such manner as to close the shear, such closing action is immediately followed by engagement of the roller 75 with the tooth 76 to swing the yoke in the opposite direction and thereby instantly open the shear blades 9.

The rotative adjustment of the ring plate 70 permits change in timing as between the operation of the shears and the operation of the feeding mechanism, so that shearing may be effected early or later with respect to the extrusion of the glass in the flow ring, as may be desired.

It will be understood that flow of liquid from types of containers other than glass furnace boots may be controlled by my apparatus, and that the use of a bell may not be necessary if the air space in the boot does not have communication with the air space in the furnace proper.

I claim as my invention:—

1. The method of feeding molten glass through an orifice in the lower wall of a receptacle, which comprises applying fluid pressure to the glass at a point above the orifice by moving a body of liquid within a conduit that communicates with the said receptacle, the liquid being positively moved in one direction and having flow in the opposite direction under the influence of gravity only, the liquid being of greater weight than the volumes of glass acted upon thereby.

2. The method of feeding molten glass through an orifice in the lower wall of a receptacle, which comprises applying fluid pressure to the glass at a point above the orifice by moving a body of liquid within a conduit that communicates with the said receptacle, the liquid being positively moved to create pressure within the receptacle, and having flow under the influence of gravity only, in a direction to reduce pressure within the receptacle, the liquid being of greater weight than the volumes of glass acted upon thereby.

3. The method of controlling flow of molten glass through an orifice contained in the lower wall of a receptacle, which comprises periodically creating suction within said receptacle by movements of a body of liquid under the force of gravity only, the said liquid being contained in a conduit which communicates with the receptacle, the liquid being of greater weight than the volumes of glass acted upon thereby.

4. The method of feeding molten glass through an orifice in the lower wall of a boot, which comprises mounting a bell above and in proximity to the orifice, the interior of the bell having communication with the boot at a point below the pool level, and effecting pulsations of air within the bell, only by rise and gravity fall of a body of liquid within a conduit that communicates with the interior of the bell, the liquid being of greater weight than the glass which enters the bell.

5. The method of controlling discharge of liquid from a container, which comprises periodically imparting impulses to said liquid, by movement of another body of liquid against gravity in one direction, and then releasing the said body of liquid, to effect pulsations within a conduit that communicates with the said container, the first-named body of liquid being of greater weight than the volumes of liquid acted upon thereby.

6. The combination with a receptacle for molten glass or the like having a discharge orifice adjacent to the bottom of the receptacle, of a conduit communicating with the receptacle, a vertically-disposed chamber communicating with the said conduit, a compressible and expansible reservoir communicating with said conduit, and means for periodically compressing said reservoir to effect vertical displacement of liquid contained therein, the said means being operable more quickly in one direction than the other.

7. The combination with a receptacle for molten glass or the like having a discharge orifice adjacent to the bottom of the receptacle, of a conduit communicating with the receptacle, a vertically-disposed chamber communicating with the said conduit, a compressible and expansible reservoir communicating with said conduit, and means for periodically compressing said reservoir to effect vertical displacement of liquid contained therein, the said means being more quickly operable in its release movement than in its compressing movement.

8. The combination with a receptacle for molten glass or the like having a discharge orifice adjacent to the bottom of the receptacle, of a conduit communicating with the receptacle, a vertically-disposed chamber communicating with the said conduit, a compressible and expansible reservoir communicating with said conduit, a presser member, means for moving the presser member toward and from the reservoir to alternately compress and release the same, and means for varying the range of movement of the said presser member.

9. The combination with a receptacle for molten glass or the like having a discharge orifice adjacent to the bottom of the receptacle, of a conduit communicating with the receptacle, a vertically-disposed chamber communicating with the said conduit, a compressible and expansible liquid reservoir communicating with said conduit, a presser member movable to compress the reservoir, and means for controlling rate of retractive movement of said presser member.

10. The combination with a receptacle for molten glass or the like having a discharge orifice adjacent to the bottom of the receptacle, of a conduit communicating with the receptacle, a vertically-disposed chamber communicating with the said conduit, a compressible and expansible liquid reservoir communicating with said conduit, a presser member movable to compress the reservoir, and means for causing the presser member to move more rapidly on its return stroke than on its pressing stroke.

11. The combination with a receptacle having a discharge orifice adjacent to its lower side, of a compressible reservoir, a conduit connecting the receptacle with the reservoir, a presser member cooperating with said reservoir, a rotatable driving member, link connections between said driving member and said presser, and means for periodically making and breaking driving connection between said driving member and the presser member.

12. The combination with a receptacle having a discharge orifice adjacent to its lower side, of a compressible reservoir, a conduit connecting the receptacle with the reservoir, a presser member cooperating with said reservoir, a rotatable driving member, link connections between said driving member and said presser, means for periodically making and breaking driving connection between said driving member and the presser member, and means for returning the presser member to retracted position upon breaking of said driving connection.

13. The combination with a receptacle having a discharge orifice adjacent to its lower side, of a compressible reservoir, a conduit connecting the receptacle with the reservoir, a presser member cooperating with said reservoir, a rotatable driving member, link connections between said driving member and said presser, and a tripping device adjustable circumferentially of the driving member for periodically breaking driving connection with said presser member.

14. The combination with a receptacle having a discharge orifice adjacent to its lower side, of a compressible reservoir, a conduit connecting the receptacle with the reservoir, a presser member cooperating with said reservoir, a rotatable driving member, link connections between said driving member and said presser, a tripping device adjustable circumferentially of the driving member, for periodically breaking driving connection with said presser member, and means operable at a predetermined point in the path of travel of the driving member for restoring driving connection with the presser member.

15. The combination with a receptacle having a discharge orifice adjacent to its lower side, of a compressible reservoir, a conduit connecting the receptacle with the reservoir, a presser member cooperating with said reservoir, a driving member, an operating connection between the driving member and the presser member, and adjustable means for periodically making and breaking the operating connection between the driving member and the presser member.

16. The combination with a receptacle having a discharge orifice adjacent to its lower side, of a compressible reservoir, a conduit connecting the receptacle with the reservoir, a presser member cooperating with said receptacle, a driving member, a releasable operating connection between the driving member and the presser member, means for breaking said connection at the completion of a pressure stroke, and means for thereafter restoring the connection.

17. The combination with a receptacle having a discharge orifice adjacent to its lower side, of a compressible reservoir, a conduit connecting the receptacle with the reservoir, a presser member cooperating with said reservoir, a driving member, a releasable operating connection between the driving member and the presser member, and adjustable means for breaking the connection, to limit pressing movement of the presser member.

18. The combination with a receptacle for molten glass or the like having a discharge orifice adjacent to the bottom of the receptacle, of a conduit communicating with the receptacle, a chamber communicating with said conduit, a contractible and expansible reservoir communicating with said conduit, a device for contracting the reservoir to effect vertical displacement of the liquid contained therein, operating mechanism for said device, and means for varying the movements of the said device relative to movement of the operating mechanism.

ALFRED E. HAMILTON.